(12) United States Patent  (10) Patent No.: US 6,592,338 B2
Zebuhr  (45) Date of Patent: Jul. 15, 2003

(54) ROTATING COMPRESSOR (75) Inventor: William H. Zebuhr, Nashua, NH (US)

(73) Assignee: Ovation Products Corporation, Nashua, NH (US)

( * ) Notice: Subject to any disclaimer, the term of this patent is extended or adjusted under 35 U.S.C. 154(b) by 0 days.

(21) Appl. No.: 10/002,582

(22) Filed: Nov. 30, 2001

(65) Prior Publication Data

US 2002/0038555 A1 Apr. 4, 2002

Related U.S. Application Data (63) Continuation-in-part of application No. 09/209,947, filed on Dec. 11, 1998, now abandoned, and a continuation-in-part of application No. 09/765,263, filed on Jan. 18, 2001.

(51) Int. Cl.⁷ .............................. F04B 3/00; F04B 5/00; F04B 25/00
(52) U.S. Cl. .......................... 417/259; 202/176; 310/80
(58) Field of Search ................................ 471/259, 295; 123/18 R, 55.2, 90.1; 202/176, 177; 184/5; 310/80

(56) References Cited

U.S. PATENT DOCUMENTS

| | | | |
|---|---|---|---|
| 2,425,813 A | 8/1947 | Kuntz | |
| 2,703,310 A | 3/1955 | Kretchmar | |
| 2,899,366 A | 8/1959 | Hickman | |
| 3,136,707 A | 6/1964 | Hickman | |
| 3,721,346 A | 3/1973 | Lore et al. | |
| 3,740,597 A * | 6/1973 | Mulasmajic | 310/80 |
| 3,771,918 A | 11/1973 | Winter | |
| 3,861,222 A | 1/1975 | Braun et al. | |
| 3,864,252 A | 2/1975 | Morin et al. | |
| 3,956,072 A * | 5/1976 | Huse | 202/177 |
| 4,035,243 A | 7/1977 | Katz et al. | |
| 4,072,210 A * | 2/1978 | Chien | 184/5 |
| 4,105,371 A | 8/1978 | Savabe et al. | |
| 4,125,946 A | 11/1978 | Prager | |
| 4,129,014 A | 12/1978 | Chubb | |
| 4,235,679 A | 11/1980 | Swaidan | |
| 4,267,021 A | 5/1981 | Speros et al. | |
| 4,307,997 A | 12/1981 | Richards et al. | |

(List continued on next page.)

FOREIGN PATENT DOCUMENTS

| | | |
|---|---|---|
| CH | 213478 A | 2/1941 |
| DE | 714705 C | 11/1941 |
| FR | 803938 A | 10/1936 |
| GB | 263053 A | 12/1926 |
| WO | WO 00/34656 A1 | 6/2000 |

OTHER PUBLICATIONS

Yeaple, Franklin D., Fluid Power Design Handbook, 1984, pp. 131–133, Marcel Dekker, Inc., New York, New York.
What is . . . Distillation www.goodwaterco.com.
Butuzov, Pukhovoy and Rifert, *Experimental Determination of the Minimum Irrigation Density in a Thin–Film Rotating Disk Apparatus*, Fluid Mechanics–Soviet Research, vol. 5, No. 1, Jan.–Feb. 1976.

Primary Examiner—Teresa Walberg
Assistant Examiner—L Fastovsky
(74) Attorney, Agent, or Firm—Cesari and McKenna, LLP (57) ABSTRACT A vapor-compression distiller includes a rotary heat exchanger. A reciprocating compressor (26) maintains a pressure difference between the compressor's evaporation chambers (46) and its condensation chambers (44). The compressor is assembled in a common rotating assembly with the heat exchanger, so the distiller does not need rotating seals between the compressor and heat exchanger. The compressor includes two pistons (56 and 58) driven in opposite directions in a rotating piston chamber (54). The directions in which they thereby reciprocate are substantially parallel to the rotating assembly's axis.

23 Claims, 8 Drawing Sheets

U.S. PATENT DOCUMENTS

| | | |
|---|---|---|
| 4,308,720 A | 1/1982 | Brandstadter |
| 4,369,633 A | 1/1983 | Snyder |
| 4,390,322 A | 6/1983 | Budzich |
| 4,413,474 A | 11/1983 | Moscrip |
| 4,440,601 A | 4/1984 | Katz et al. |
| 4,536,258 A | 8/1985 | Huhta-Koilisto |
| 4,671,856 A | 6/1987 | Sears |
| 4,734,167 A | 3/1988 | Goeldner |
| 4,787,823 A | 11/1988 | Hultman |
| 4,792,289 A | 12/1988 | Nieratschker |
| 4,832,578 A | 5/1989 | Putt |
| 4,878,819 A | 11/1989 | Bozoyan |
| 4,909,716 A | 3/1990 | Orosz et al. |
| 5,030,066 A * | 7/1991 | Aihara et al. ............... 417/295 |
| 5,045,155 A | 9/1991 | Ramsland |
| 5,483,929 A | 1/1996 | Kuhn et al. |
| 5,533,358 A | 7/1996 | Crandall et al. |
| 5,628,879 A | 5/1997 | Woodruff |
| 5,638,736 A | 6/1997 | Murakami et al. |
| 5,720,177 A | 2/1998 | Derrick et al. |
| 5,810,975 A | 9/1998 | Bourdel |
| 5,818,131 A | 10/1998 | Zhang |
| 5,983,845 A | 11/1999 | Yanaglsawa |
| 6,015,270 A * | 1/2000 | Roth ......................... 417/259 |
| 6,209,495 B1 * | 4/2001 | Warren ..................... 123/55.2 |
| 6,244,228 B1 * | 6/2001 | Kuhn et al. ................ 123/90.1 |
| 6,258,215 B1 * | 7/2001 | Samsonov et al. .......... 202/176 |
| 6,328,536 B1 * | 12/2001 | Zebuhr ....................... 417/259 |
| 6,357,397 B1 * | 3/2002 | Kull et al. ................ 123/18 R |

\* cited by examiner

ROTATING COMPRESSOR

CROSS-REFERENCE TO RELATED APPLICATIONS

The present application is a continuation-in-part of commonly assigned U.S. patent application Ser. No. 09/209,947, which was filed on Dec. 11, 1998, now abandoned by William H. Zebuhr for a Reciprocating Low Pressure Ratio Compressor, and of commonly assigned copending U.S. patent application Ser. No. 09/765,263, which was filed on Jan. 18, 2001, by William H. Zebuhr for a Distiller Employing Cyclical Evaporation-Surface Wetting, both of which are hereby incorporated by reference.

BACKGROUND OF THE INVENTION

1. Field of the Invention

The present invention concerns fluid compressors, particularly those used in distillation apparatus.

2. Background Information

Although billions of dollars worth of water-purification equipment is manufactured annually, a relatively small percentage of it employs what is in most respects the most thorough approach, namely, distillation. Perhaps the main reason for this is that the simplest distillation approaches tend to be energy-intensive; considerable energy must be expended in vaporizing the liquid to be purified. Now, much of the heat of vaporization can be recovered if appropriate measures are taken, but such measures can be expensive. To appreciate the kinds of compromises that must be made between heat recovery and capital cost, consider distillers of the vapor-compression type.

In a vapor-compression distiller, a heat-transfer medium separates evaporation chambers from condensation chambers. A compressor draws vapor that has evaporated from liquid in the evaporation chambers and delivers it at a higher pressure to the condensation chambers, where it condenses. Since the vapor pressure is therefore higher on the condensation side of the heat-transfer material, the vapor condenses in the condensation chamber at a temperature higher than that at which the liquid evaporates in the evaporation chamber. The heat-transfer medium therefore conducts heat from the condensation chamber to the evaporation chamber, so energy expended in making the liquid evaporate is recovered to an extent during condensation.

Of course, thermodynamics dictates that some energy is expended to drive the process, but the amount of that energy can be made arbitrarily small by reducing the difference between the evaporation- and condensation-chamber pressures. But reducing the pressure difference and thus the temperature difference also reduces the rate of heat transfer per unit area of heat-transfer medium. Everything else being equal, therefore, a pressure-difference reduction will necessitate an increase in the area of the heat-transfer medium needed to maintain a given capacity. The resultant capital-cost increase tends to compromise the savings that greater heat recovery affords.

But the required heat-transfer area can be reduced if the rate of heat transfer per unit area can be increased for a given pressure (and thus temperature) difference. Using a rotary heat exchanger is one way to do this. In a rotary heat exchanger, a motor or other rotary-motion source spins the heat-transfer surfaces at a high rate so that liquid residing on those surfaces experiences a high centrifugal force. That force tends to reduce the liquid-film thickness that surface tension causes, and a thinner film results in greater heat transfer for a given temperature difference. The use of rotary heat exchangers can therefore result in a good compromise between heat-transfer efficiency and capital cost. But the rotating heat-transfer surfaces introduce complexity, such as rotating seals, etc., that have tended to limit such distillers' use in smaller, low-capacity applications.

SUMMARY OF THE INVENTION

I have developed a way of reducing some of the complexity that using rotary heat exchangers can otherwise cause. In accordance with my invention, the compressor used to maintain the pressure difference between the evaporation and condensation chambers is made to spin with the rotating heat exchanger. Thus providing the compressor and heat exchanger in a common rotating assembly eliminates the need to provide the rotating seals that would otherwise be needed between the heat exchanger and compressor. This not only simplifies distiller manufacture but also reduces energy loss and required maintenance.

I have also developed a compressor that lends itself particularly to use in such distillers. The compressor is of the reciprocating type, in which one or more pistons so reciprocate in a piston chamber as to compress fluid that the chamber contains. In accordance with the invention, the piston chamber is formed by a rotary assembly, and each piston is slideably disposed in the piston chamber and caused to reciprocate in directions substantially parallel to that assembly's rotational axis. Such an arrangement minimizes the Coriolis forces to which that the compressor's reciprocation would otherwise subject it.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
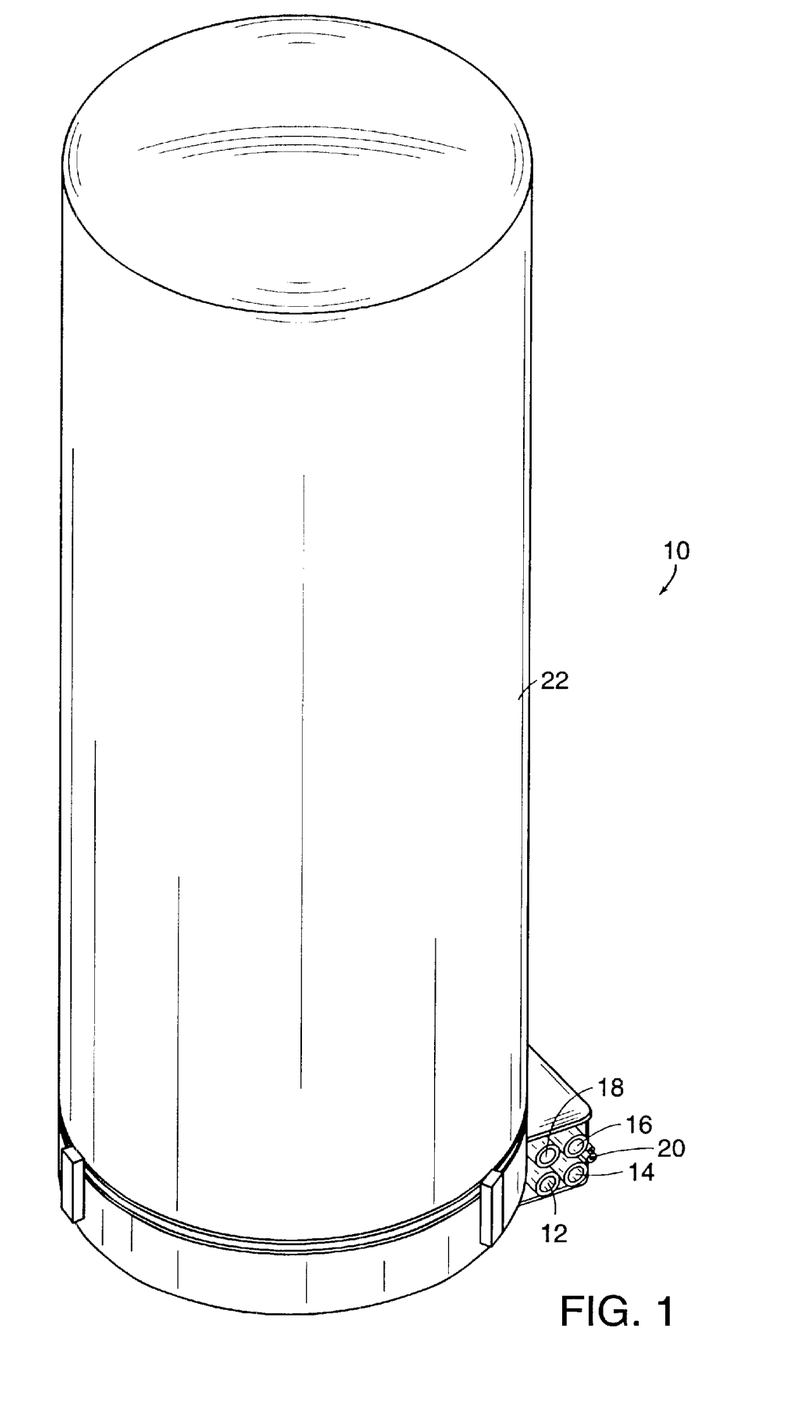
FIG. 1 is an isometric view of a distiller in which a compressor that embodies the present invention is included.

FIG. 1 is an exterior isometric view of a distillation unit 10 in which a compressor employing the present invention's teachings can be employed. The distillation unit 10 includes a feed inlet 12 through which the unit draws a feed liquid to be purified, typically water containing some contamination. The unit 10 purifies the water, producing a pure condensate at a condensate outlet 14. The volume rate at which condensate is produced at the outlet 14 will in most cases be only slightly less than that at which feed liquid enters inlet 12, nearly all the remainder being a small stream of concentrated impurities discharged through a concentrate outlet 16. The unit also may include a safety-drain outlet 18.

Since the illustrated unit is powered by electricity and may be remotely controlled or monitored, the drawing also includes electrical cables 20. And it depicts the unit as including an insulating housing 22, which some units intended for high-efficiency use may employ.

Figure 2:
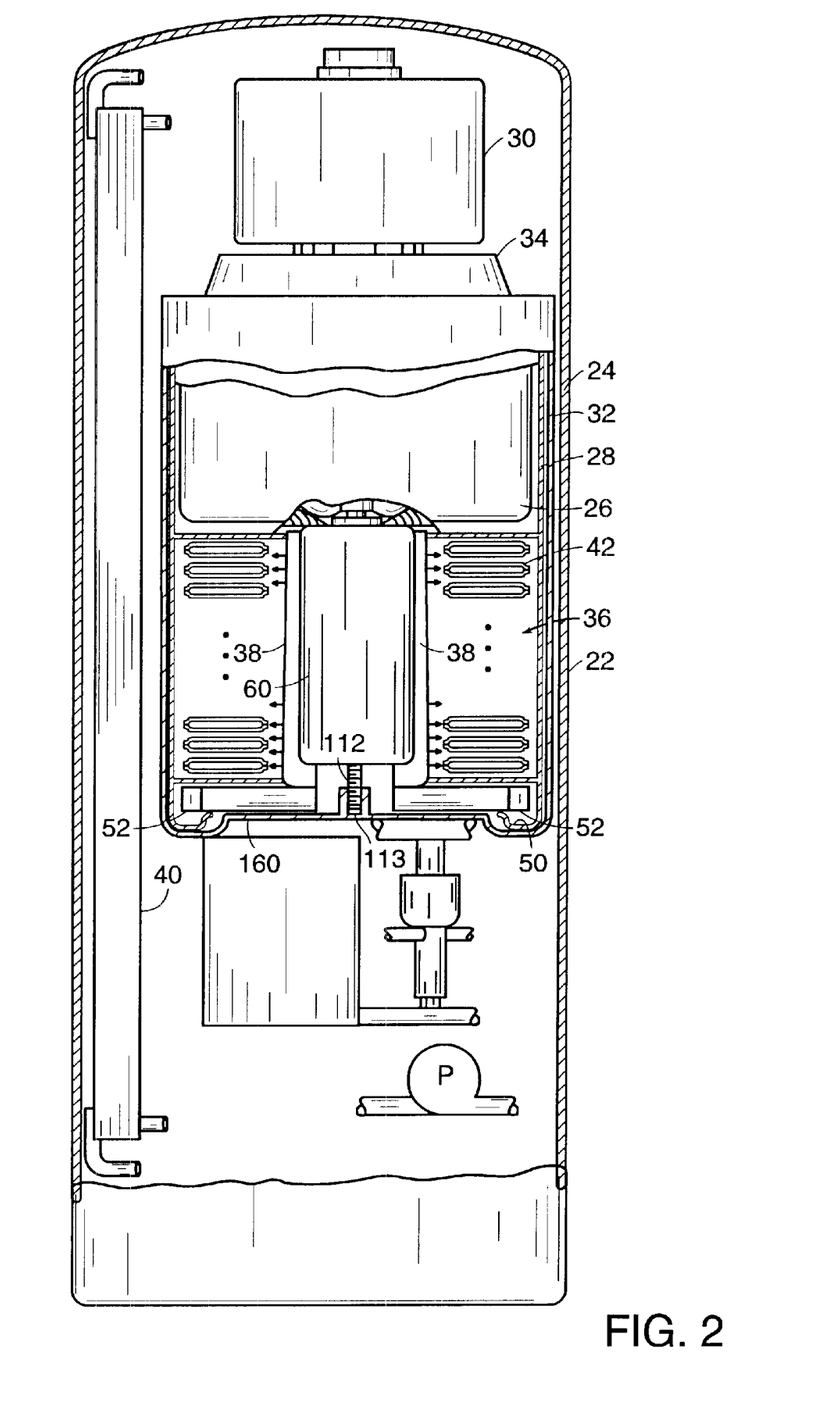
FIG. 2 is a vertical cross-sectional view of the distiller.

FIG. 2 is a simplified cross-sectional view of the distillation unit. It depicts the housing 22 as having a single-layer wall 24. In single-layer arrangements, the wall is preferably made of low-thermal-conductivity material. Alternatively, it may be a double-layer structure in which the layers are separated by insulating space. The compressor 26 that exemplifies the present invention is disposed in an assembly that rotates during operation and includes a generally cylindrical shell 28 driven by a motor 30. The rotating assembly's shell 28 is disposed inside a stationary vapor-chamber housing 32 on which is mounted a gear housing 34. That housing supports the motor 30 and encloses a drive train that drives the shell 28 and thus the entire rotating assembly. The vapor-chamber housing 32 in turn rests in a support omitted from the drawing for the sake of simplicity.

Figure 3:
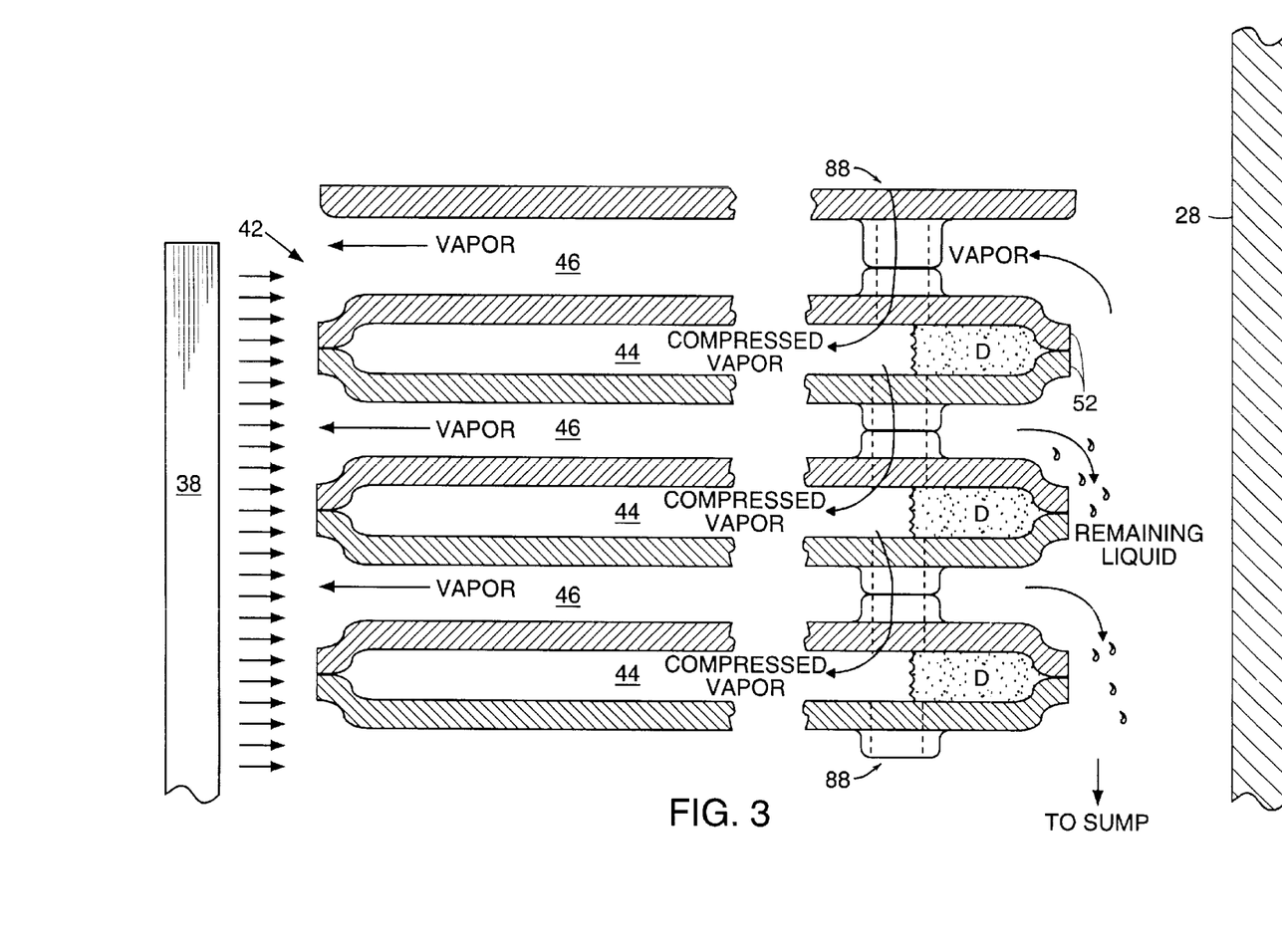
FIG. 3 is a more-detailed cross-sectional view of some of the distiller's heat-transfer plates.

The compressor 26's purpose is to provide a small pressure difference across a rotary heat exchanger 36, which is also part of the rotating assembly. Stationary sprayers 38 direct water to be purified, which has been preheated by a counterflow heat exchanger 40, onto the heat exchanger's plurality of stacked annular plates 42. Plates 42 spin about their axes as part of the rotating assembly. FIG. 3, which depicts the heat exchanger's radially inward part on the left and the radially outward part on the right, shows that successive plates form enclosed condensation chambers 44 interspersed with open evaporation chambers 46.

As will be explained in more detail below, the condensation chambers 44 contain vapor that the compressor has pressurized. The evaporation chambers 46, on the other hand, communicate with the compressor's inlet, which draws vapor from the evaporation chambers through the radially inward void that the plates 42 define. As a consequence, the vapor pressure that prevails in the evaporation chambers is lower than the vapor pressure that prevails in the condensation chambers. This means that the boiling point is higher in the condensation chambers than in the evaporation chambers, and the plates 42 therefore transfer heat from the condensation chambers' condensing vapor to the thereby-evaporating water in the evaporation chambers, and the compressor draws in the resultant evaporation-chamber vapor.

The water that has thereby condensed in the condensation chambers is removed, as will be explained in more detail below, and it issues from the distiller's outlet 14 (FIG. 1) as its (purified) output after flowing through the counterflow heat exchanger 40 (FIG. 2) to preheat the inlet water. Centrifugal force drives toward the shell 28's inner surface evaporation-chamber water that has not evaporated, and this water flows to a rotating sump 50. There the water's kinetic energy drives it through stationary scoops 52 for recirculation back to the sprayers 38.

Figure 4:
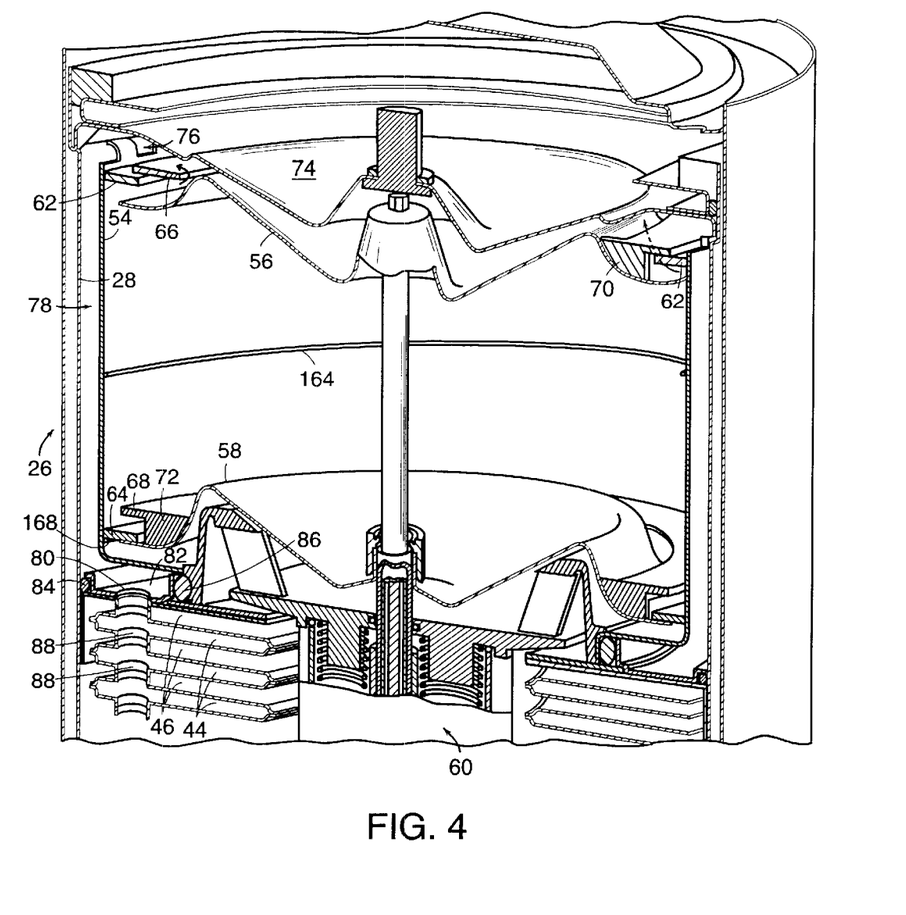
FIG. 4 is an isometric cut-away view of the compressor.

FIG. 4 depicts compressor 26 in more detail. The compressor includes a (spinning) compressor cylinder 54 within which two pistons 56 and 58, which spin with the compressor cylinder, are caused to reciprocate out of phase with each other by a rotation-to-reciprocation converter 60 described below. The directions of piston travel are parallel to the rotating assembly's rotational axis, so Coriolis forces are essentially avoided. Also, the pistons' centers of mass are disposed on the rotational axis, and this tends to minimize vibration. As a piston rises, its respective piston ring 62 or 64 forms a seal between the piston and the compressor cylinder 54's inner surface and thereby prevents vapor from flowing from the piston's downstream side to its upstream side. The piston therefore draws vapor from the heat exchanger's central region. As a piston travels downward, on the other hand, its respective piston ring tends to lift off the piston surface and thereby break the seal between the cylinder wall and the piston. Annular piston-ring retainers 66 and 68, which respective struts 70 and 72 secure to respective pistons 56 and 58, drag respective piston rings 62 and 64 downward after the seal has been broken. The piston rings and stops thus leave clearances that permit vapor flow past the downward-moving pistons. In the illustrated embodiment, each piston ring's area exceeds one-quarter of the piston chamber's area, so the piston rings can leave large, low-flow-resistance openings in their downstream positions.

Of course, permit and prevent are relative terms in this context; practical embodiments will not seal perfectly, so there is some minuscule flow past a piston even when its piston ring is "sealed" against it. But the piston and ring will be so designed as to present at least an order of magnitude greater flow resistance when the piston travels downstream than when it travels upstream, so an upstream (here, downward)—moving piston does not urge the vapor back upstream as effectively as a downstream (here, up-ward)—moving piston draws it upward. The piston rings thus double as check valves, eliminating the need for separate check valves and the additional leakage paths to which they inevitably give rise. As will be explained below, the pistons' reciprocation is so phased that there is always one piston moving upward, and thereby effectively drawing the vapor upward, while the other is returning downward.

For reasons that will become apparent directly, the vapor that the pistons 56 and 58 have driven upward cannot pass upward beyond the compressor's cylinder head 74. But slots 76 formed in the compressor wall's upper lip provide paths by which the vapor thus drawn from the heat exchanger's central region can be driven down through an annular passage 78 formed between the compressor cylinder 54's outer surface and the rotating-assembly shell 28. This passage leads to openings 80 in an annular cover plate 82 sealed by O-rings 84 and 86 between the compressor cylinder 54 and the rotating-assembly shell 28. The openings 80 register with openings 88 in the heat-exchanger plates 42 that form passages between the condensation chambers 44 (FIG. 3).

In short, the compressor cylinder 54, the cylinder head 74, and the rotating-assembly shell 28 cooperate to form a guide that directs vapor along a vapor path from the evaporation chambers 46 to the condensation chambers 44. And the compressor compresses the vapor that follows this path. As was observed above, therefore, the vapor pressure is higher in the condensation chambers 44 than in the evaporation chambers 46. Note also that the seals between the compressor and heat exchanger are simple O-ring seals 84 and 86; because the compressor and heat exchanger rotate together, the complexity of employing rotary seals for this purpose is avoided, as is the attendant power loss.

Figure 5:
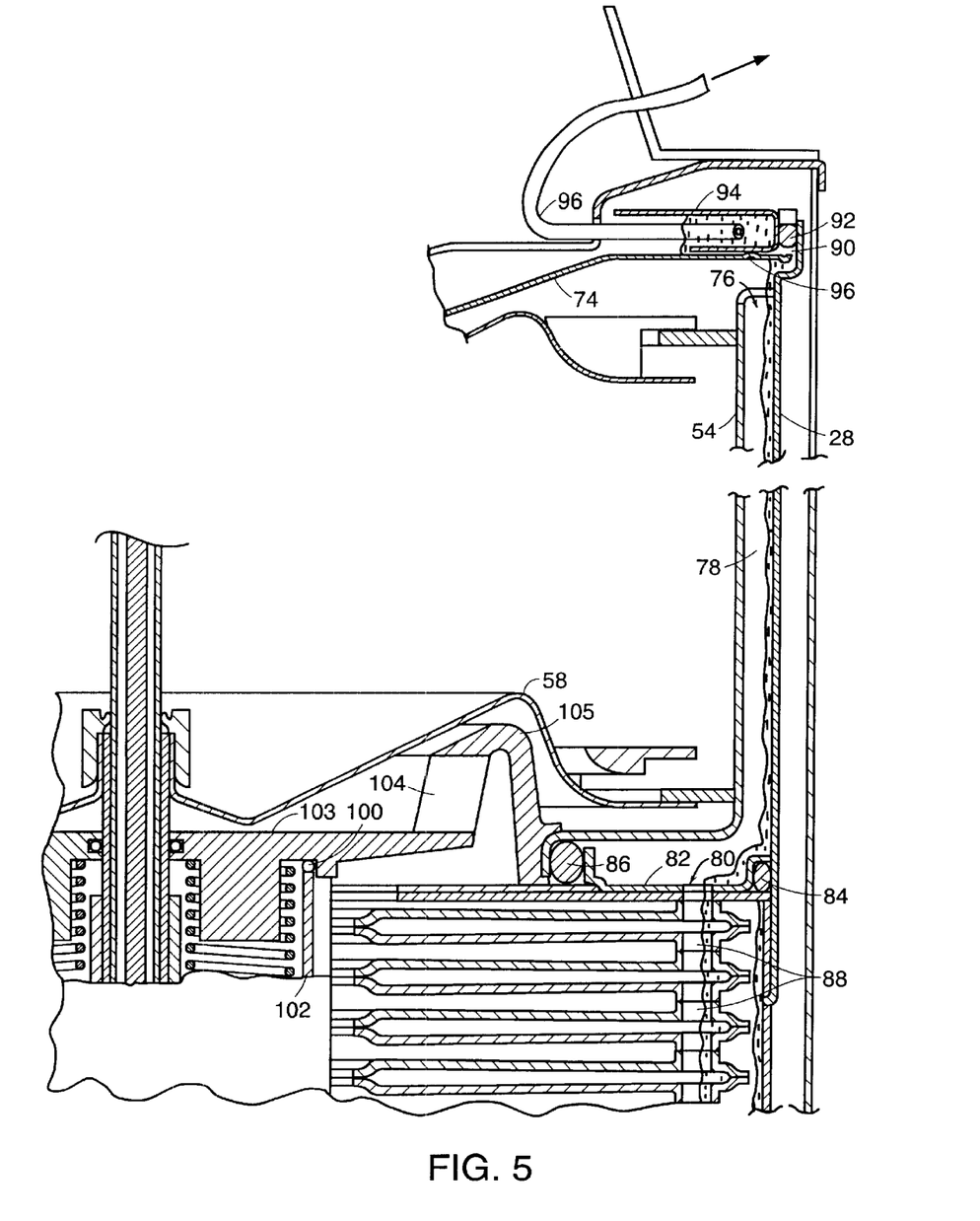
FIG. 5 is a detailed cross section depicting the distiller's compressed-vapor return path.

In the illustrated embodiment, the rotating assembly rotates at a relatively high rate, say, 700 to 1000 rpm. The resultant centrifugal force causes the now-purified condensate to collect in the outer perimeters of the condensation chambers, between which it can flow through the passages that the heat-exchanger-plate openings 88 form. As FIG. 5 shows, the condensate therefore flows out through the openings 80 in the top of the heat exchanger and travels along the channel 78 by which the compressed vapor flowed into the heat exchanger.

Like the compressed vapor, the condensate can flow through the openings 76 in the compressor wall's lip. But the condensate can also flow past the cylinder head 74 because of a clearance 90 between the cylinder head 74 and the rotating-assembly shell 28, whereas the condensate's presence in that clearance prevents the compressed vapor from similarly flowing past the cylinder head. An O-ring 92 seals between the rotating-assembly shell 28 and a rotating annular channel-forming member 94 secured to the cylinder head 74, but spaced-apart bosses 96 formed in the cylinder head 74 provide clearance between the cylinder head and the channel member so that the condensate, urged by the pressure difference that the compressor imposes, can flow inward and into channel-forming member 94's interior.

Like the cylinder head 74 to which it is secured, the channel-forming member 94 spins with the rotary heat exchanger. So centrifugal force causes the purified condensate that it contains to collect in the channel's radially outward extremity. The spinning con densate's kinetic energy drives it into a stationary scoop tube 96, from which it flows to FIG. 1's condensate outlet 14 by way of a route that includes FIG. 2's counterflow heat exchanger 40.

We now turn to a description of the compressor driver. The particular type of driver used to cause piston reciprocation is not critical to the present invention's broader aspects, and a conventional crankshaft piston-rod approach could be employed. But I prefer a driver that results in less pressure pulse and, in contrast to crankshaft arrangements, applies essentially only axial forces to the piston; a driver that applies essentially only axial forces tends to cause less piston-ring friction and thus allows greater flexibility in piston-ring design. The illustrated embodiment's example of such a driver includes the motor 30, a gear train enclosed within the gear housing 34, the rotating-assembly shell 28, which the motor drives through the gear train, and the rotation-to-reciprocation converter 60.

Figure 6:
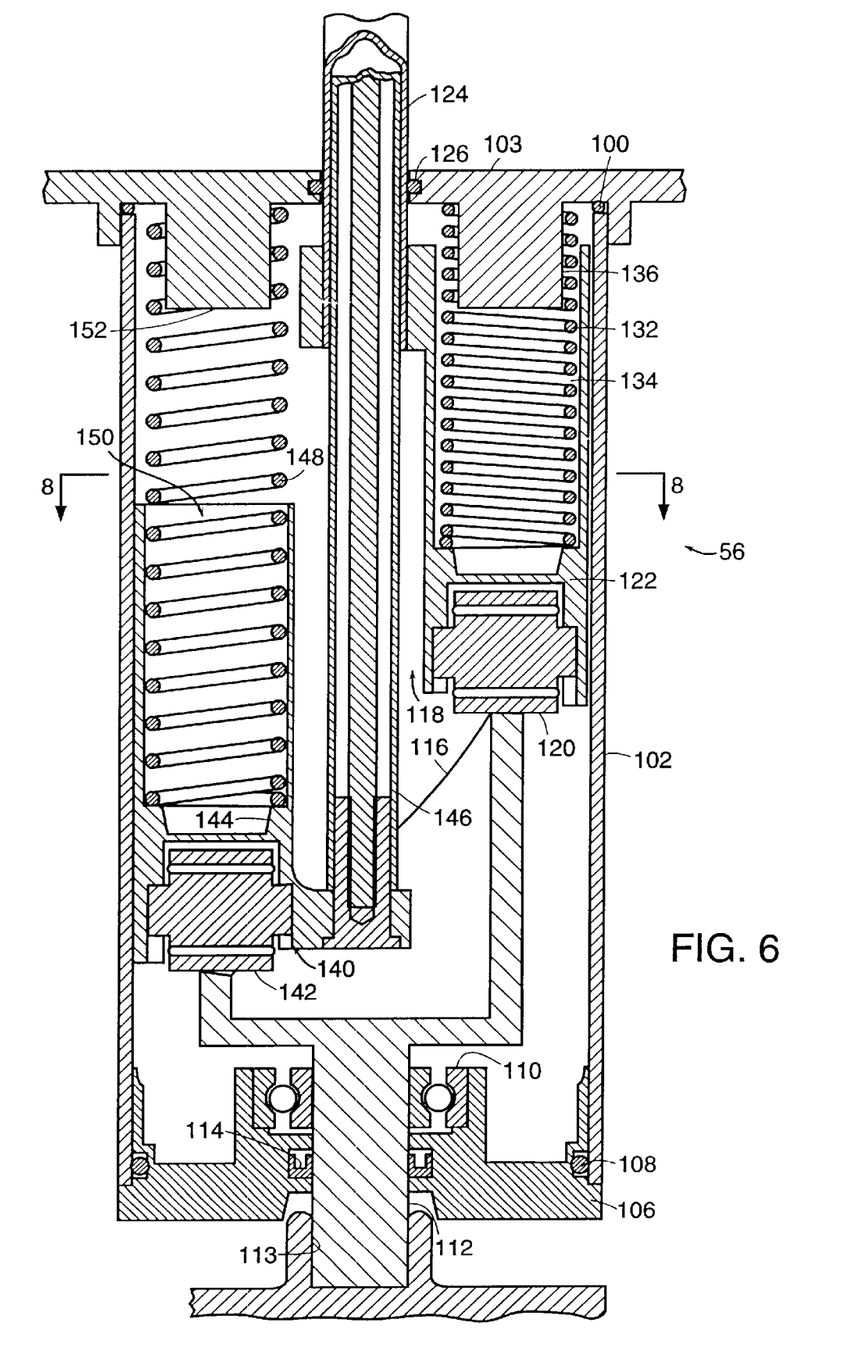
FIG. 6 is a cross-sectional view, with parts removed, of a cam/follower assembly included in the compressor driver.
Figure 7:
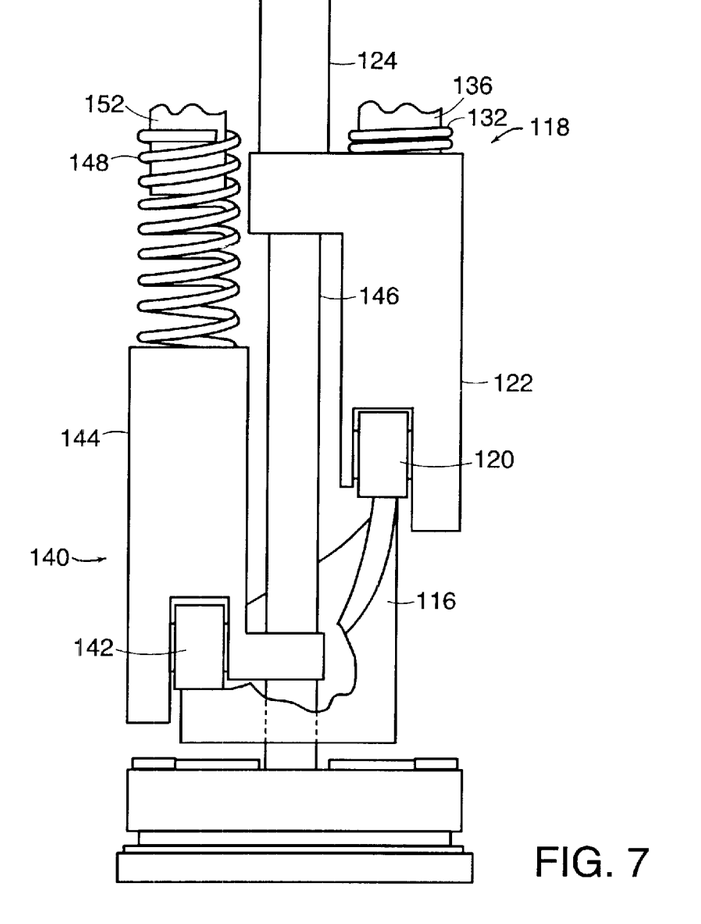
FIG. 7 is a partially cut-away vertical elevation of the cam/follower assembly with parts removed.
Figure 8:
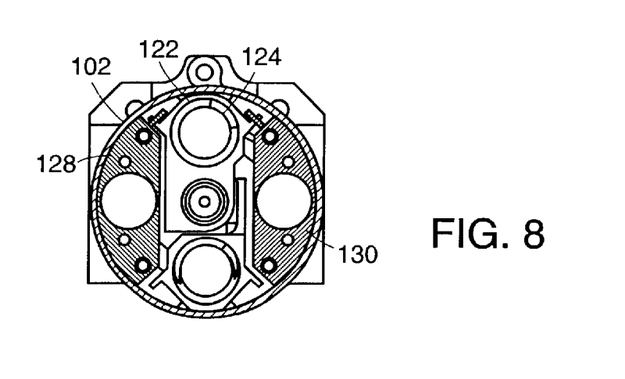
FIG. 8 is a cross-sectional view of a cam/follower assembly taken at line 8—8 of FIG. 6.

FIGS. 6, 7, and 8 show that the rotation-to-reciprocation converter takes the form of a cam/follower mechanism. An O-ring 100 shown in FIG. 6 seals a cylindrical cam-mechanism housing 102 to the hub portion 103 of a generally annular cam-mechanism cap. As FIG. 5 shows, hub portion 103 is coupled by the cap's spokes 104 and rim 105 through the cover plate 82 to the rotating-assembly shell 28. The cap therefore undergoes rotation, which it imparts to the cam-mechanism housing 102 and thereby also to a generally circular end piece 106 (FIG. 6) secured in the cam-mechanism housing 102 and sealed to it by an O-ring 108. The end piece 106 and housing 102 are held in position by a bearing 110 mounted on a stationary camshaft 112 secured in a pocket 113 of the vapor-chamber housing 32 shown in FIG. 2. A lip seal 114 seals the end piece 106 to the camshaft 112, on whose upper end a (stationary) cam 116 is formed.

FIG. 7 is a simplified elevational view of the cam/follower mechanism with the cap 104 and housing 102 removed and the cam 116 partially broken away. It shows that a first cam follower 118 includes a roller bearing 120 and a slider 122, in which the roller bearing 120 is rotatably mounted. A lower-piston rod 124 is secured to the slider 122 and, as FIG. 6 shows, extends through a central aperture in the cam-mechanism cap's hub portion 103, to which an O-ring 126 seals it. FIG. 8 shows guides 128 and 130, omitted for the sake of simplicity from FIGS. 6 and 7, that are mounted on the housing 102. The guides permit the slider to slide axially of the housing but keep it in a fixed angular position with respect thereto so that the slider orbits the housing axis as the housing rotates. A bias spring 132 disposed in the slider 122's central aperture 134 (FIG. 6) and positioned by a spring guide 136 formed by the cap hub portion 103 so acts between the cap and the slider 122 as to bias the roller bearing 120 against the cam 116's cam surface. Since the cam is stationary and the roller bearing 120 orbits the housing axis with the slider 122, the slider reciprocates axially and thereby causes reciprocation of the piston rod 124 and thus of the piston 58 (FIG. 4) secured to it.

Of course, the piston can be driven in ways that do not employ the rotating assembly's source of rotation. Even in drivers that do employ rotation-to-reciprocation converters, converters other than cam/follower arrangements can be used, although I prefer the cam/follower approach. And cam/follower assemblies themselves can differ considerably from the illustrated type. The profile-providing cam can be provided in the rotating assembly, for example, while the non-profiled "follower" can be stationary. And, even if the cam follower is disposed on the rotating assembly, it may not undergo only translational motion, as the illustrated follower does; it could be so mounted as to pivot, for example. So piston drive can be provided in many ways.

To drive the upper piston, the drive mechanism includes a second cam follower 140. It similarly includes a second roller bearing 142 and a second slider 144, on which bearing 142 is rotatably mounted. An upper-piston rod 146 extending through the lower-piston rod 124's central bore is secured at opposite ends to the second slider 144 and the upper piston 56. A second bias spring 148 disposed in the second slider 144's central aperture 150 and positioned by a second spring guide 152 formed on the cap's hub portion 103 similarly acts between the cap and the second slider 144 to bias the second roller bearing 142 against the cam 116's cam surface. So the upper piston 56 is driven to reciprocate, as the lower piston 58 is. Since the second cam follower's position on the cam 116 is diametrically opposite that of the first cam follower, though, the upper piston's reciprocation is 180° out of phase with that of the lower piston.

Figure 9:
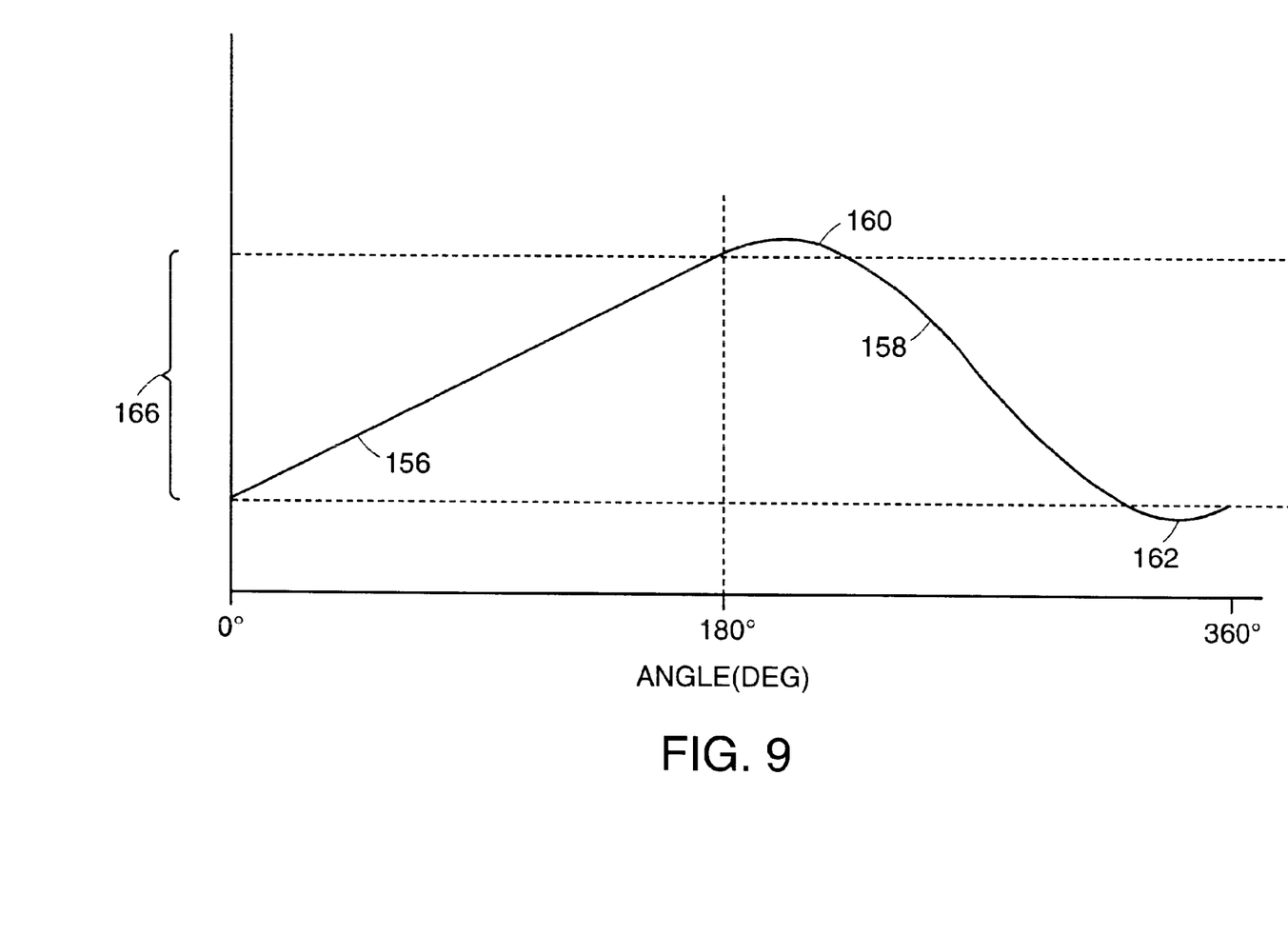
FIG. 9 is a profile diagram of the cam/follower assembly's cam.

What this means is best appreciated considering FIG. 9, which is a plot of the cam 116's profile. That profile is so designed as to keep the compression stroke's speed constant and eliminate any significant period in which neither piston is moving upward. As the cam follower traverses the cam section represented by linear profile portion 156, it drives the piston downstream, i.e., in a compression stroke. Because that cam position's profile is linear, the piston's speed is constant during this interval if the rotating assembly's rotational speed is. To make sure that there is always at least one piston that is in this linear compression region, that region should span at least 180° of the cam's profile (or, if there are more than two pistons, at least 360° N, where N is the number of pistons); the drawing illustrates it as spanning 180°. A return portion 158 and two reversing portions 160 and 162 make up the remaining 180° of the cam profile in that drawing.

Now, consider the situation in which the lower piston is moving upward in the linear part of its compression stroke and the upper piston is moving downward. The pressure difference across the lower piston keeps the lower piston's piston ring sealed against the piston face and thereby acting as a closed check valve. Initially, flow resistance and friction conversely keep the upper piston's piston ring spaced from the piston face so that it acts as an open check valve. Before the lower piston reaches the end of its linear region, though, the upper piston reaches its position corresponding to cam portion 162, so it decelerates. Inertia would therefore tend to cause its piston ring to seal against it; i.e., its check valve would tend to close prematurely. This would cause a pulse in the compressor flow by closing the path from the lower, compressing piston to the compressor outlet before the upper piston has reached its linear compression stroke.

To prevent such an interruption, an annular stop identified in FIG. 4 by reference numeral 164 is formed on the compressor cylinder 54's inner surface in such a position as to prevent the upper piston ring 62 from sealing against the upper piston 56's face when that piston is significantly below its linear range, i.e., significantly below the range of upper-piston positions corresponding to FIG. 9's range 166. A similar stop 168 prevents the lower piston 58 from causing such an interruption.

By providing the compressor and heat exchanger in a common rotating assembly, the present invention eliminates the need to provide the rotating seals between the heat exchanger and compressor. And, by making the reciprocation direction parallel to the rotational axis, the present invention minimizes the Coriolis forces to which it would otherwise be subject. The present invention thus constitutes a significant advance in the art.

What is claimed is:

1. A distiller that includes a liquid inlet from which it receives liquid to be purified, that produces purified liquid from liquid entering its liquid inlet, that includes a liquid outlet from which it discharges the purified liquid, and that further includes:
   A) a rotary-motion source; and
   B) a rotating assembly so coupled to the rotary-motion source as thereby to be imparted rotary motion about an axis of rotation and including:
      i) a heat exchanger that includes heat-transfer surfaces that form at least one evaporation chamber to which the distiller directs the liquid to be purified and at least one condensation chamber from which the distiller draws the purified liquid, the heat exchanger providing a heat-exchanger gas outlet by which gas produced in the at least one evaporation chamber can leave the heat exchanger and further providing a heat-exchanger gas inlet by which gas can reach the at least one condensation chamber; and
      ii) a compressor so coupled between the heat-exchanger gas outlet and the heat-exchanger gas inlet as to maintain a pressure at the heat-exchanger gas inlet higher than that at the heat-exchanger gas outlet.

2. A distiller as defined in claim 1 wherein:
   A) the distiller includes a reciprocating-motion source; and
   B) the compressor includes a piston chamber and at least one piston slideably disposed in the piston chamber and so coupled to the reciprocating-motion source as to be reciprocated thereby within the piston chamber substantially parallel to the axis of rotation.

3. A distiller as defined in claim 2 wherein the reciprocating-motion source includes the rotary-motion source and a rotation-to-reciprocation converter.

4. A distiller as defined in claim 3 wherein:
   A) the rotation-to-reciprocation converter includes:
      i) a converter stationary section; and
      ii) a converter rotating section included as part of the rotating assembly; and
   B) one of the converter stationary and rotating sections includes a cam and the other includes a cam follower.

5. A distiller as defined in claim 4 wherein the converter stationary section includes the cam and the converter rotating section includes a cam follower that so engages the cam as to be caused to reciprocate thereby when the rotating assembly rotates.

6. A distiller as defined in claim 2 wherein each piston's center of mass is located substantially on the axis of rotation.

7. A distiller as defined in claim 2 wherein the compressor includes a plurality of pistons slideably disposed in the piston chamber and so coupled to the reciprocating-motion source as to be reciprocated thereby within the piston chamber substantially parallel to the axis of rotation.

8. A distiller as defined in claim 7 wherein the reciprocating-motion source causes at least one said piston to reciprocate out of phase with another said piston.

9. A distiller as defined in claim 7 wherein a first one of the pistons is coupled to the reciprocating-motion source by a first-piston rod, which extends through a rod aperture formed in a second one of the pistons and is driven by the reciprocating-motion source from the side of the second piston opposite the side on which the first piston is disposed.

10. A distiller as defined in claim 9 wherein the second piston is coupled to the reciprocating-motion source by a second-piston rod, which is driven by the reciprocating-motion source from the side of the second piston opposite the side on which the first piston is disposed and forms a first-rod passage through which the first-piston rod extends.

11. A distiller as defined in claim 9 wherein the reciprocating-motion source causes at least one said piston to reciprocate out of phase with another said piston.

12. A distiller as defined in claim 11 wherein the second piston is coupled to the reciprocating-motion source by a second-piston rod, which is driven by the reciprocating-motion source from the side of the second piston opposite the side on which the first piston is disposed and forms a first-rod passage through which the first-piston rod extends.

13. A compressor that includes:
   A) a rotary-motion source;
   B) a reciprocating-motion source; and
   C) a rotating assembly so coupled to the rotary-motion source as thereby to be imparted rotary motion about an axis of rotation, wherein:
      i) the rotating assembly forms a piston chamber; and
      ii) the rotating assembly includes at least one piston slideably disposed in the piston chamber and so coupled to the reciprocating-motion source as to be reciprocated thereby within the piston chamber substantially parallel to the axis of rotation.

14. A compressor as defined in claim 13 wherein the reciprocating-motion source includes the rotary-motion source and a rotation-to-reciprocation converter.

15. A compressor as defined in claim 14 wherein:
   A) the rotation-to-reciprocation converter includes:
      i) a converter stationary section; and
      ii) a converter rotating section included as part of the rotating assembly; and
   B) one of the converter stationary and rotating sections includes a cam and the other includes a cam follower.

16. A compressor as defined in claim 15 wherein the converter stationary section includes the cam and the converter rotating section includes a cam follower that so engages the cam as to be caused to reciprocate thereby when the rotating assembly rotates.

17. A compressor as defined in claim 13 wherein each piston's center of mass is located substantially on the axis of rotation.

18. A compressor as defined in claim 13 wherein the compressor includes a plurality of pistons slideably disposed in the piston chamber and so coupled to the reciprocating-motion source as to be reciprocated thereby within the piston chamber substantially parallel to the axis of rotation.

19. A compressor as defined in claim 18 wherein the reciprocating-motion source causes at least one said piston to reciprocate out of phase with another said piston.

20. A compressor as defined in claim 18 wherein a first one of the pistons is coupled to the reciprocating-motion source by a first-piston rod, which extends through a rod aperture formed in a second one of the pistons and is driven by the reciprocating-motion source from the side of the second piston opposite the side on which the first piston is disposed.

21. A compressor as defined in claim 20 wherein the second piston is coupled to the reciprocating-motion source by a second-piston rod, which is driven by the reciprocating-motion source from the side of the second piston opposite the side on which the first piston is disposed and forms a first-rod passage through which the first-piston rod extends.

22. A compressor as defined in claim 20 wherein the reciprocating-motion source causes at least one said piston to reciprocate out of phase with another said piston.

23. A compressor as defined in claim 22 wherein the second piston is coupled to the reciprocating-motion source by a second-piston rod, which is driven by the reciprocating-motion source from the side of the second piston opposite the side on which the first piston is disposed and forms a first-rod passage through which the first-piston rod extends.

* * * * *